United States Patent [19]
Kelley et al.

[11] 3,835,575
[45] Sept. 17, 1974

[54] RENEWABLE BAIT AND TACKLE CONTAINER

[76] Inventors: Arnetta B. Kelley, Turtle Mound Rd., Eau Gallie; Harvey C. Poe, 540 N. Harbor City Blvd., Melbourne, both of Fla.

[22] Filed: Jan. 11, 1973

[21] Appl. No.: 322,684

[52] U.S. Cl............................... 43/56, 43/57
[51] Int. Cl............................... A01k 97/00
[58] Field of Search..................... 43/56, 57, 58

[56] References Cited
UNITED STATES PATENTS

| | | | |
|---|---|---|---|
| 2,777,241 | 1/1957 | Mullins | 43/56 |
| 3,191,337 | 6/1965 | Fant | 43/57 |

Primary Examiner—Louis G. Mancen
Assistant Examiner—J. Q. Lever
Attorney, Agent, or Firm—Wilfred G. Caldwell

[57] ABSTRACT

The invention comprises a combination bait and tackle box characterized by a porous liner which has rounded corners at the junctions of its verticle walls to preclude bait fish from crowding into a sqaure corner and suffocating. The liner communicates with the exterior of a housing or frame therefor via openings to permit the bait fish to suck air into the liner. A battery operated aerating pump is contained in a space below the liner in the housing and the housing also includes a space for one or more drawers which are interchangeable to permit the appropriate drawer full of tackle to be selected for the type fishing to be pursued; i.e., salt water, fresh water, snook, bass, trout or the like.

7 Claims, 6 Drawing Figures

PATENTED SEP 17 1974 3,835,575

RENEWABLE BAIT AND TACKLE CONTAINER

The present invention provides a combination bait container and tackle box which is oriented 100 per cent toward the taking of a predetermined type of fish or type of fishing. In other words, if the fisherman wants to go salt water fishing, he selects a drawer of salt water tackle and inserts it into the housing of the combination bait and tackle box. Or, if he wishes to go fresh water fishing, he selects a different drawer of tackle and places it in the combination container. In some cases, fishermen pursue a selected type of fish; such as the snook or bonefish, the tarpon, or the trout or bass. In these instances, the appropriate drawer, with flies or plugs, is selected for insertion into the container for the days pursuits.

Live bait is a particularly desirable attractive for many areas of the country. In Florida a bait fish known locally as pig fish and other areas as grunts are frequently carried by fishermen to their fishing grounds. Unfortunately, the pig fish have a habit of crowding into corners of conventional containers; and although the air is used up out of the water in those regions, the pig fish remain there and suffocate.

The present invention provides porous liners for use in a housing or container which have rounded corners in the compartments wherever the bait fish may be placed, and sometimes it is desirable to carry bait fish and iced beverages — in which event, the bait fish may be placed in one compartment and the beverages in another. But, since more than one species of bait fish may be carried by the fisherman, it is desirable that all compartments have rounded corners where the bait fish can congregate. Thus, the compartment-forming walls are arcutely shaped at their ends to merge with the walls of the liner.

Two further measures are incorporated in an effort to maintain the bait fish alive for extended periods of time; i.e., a full day of fishing, or maybe two or three days. The first employs openings through the frame or housing for communication with the porous lining in order that the bait fish may actually suck air from the atmosphere and into their mouths. Thus, the container actually breathes insofar as the bait fish are concerned. Next, a small portable air pump is contained within the housing and pumps air by a flexible tube into the bottom of the bait compartment. Such miniature pumps are commercially available and they can run for many hours on inexpensive batteries. However, it should be noted that the pump need not run continuously because in the cool of the morning or evening the bait fish seem to survive much better than during the heat of the day without additional aeration.

Preferably, the housing or exterior of the container is made of rigid plastic sufficient to support the load of a person sitting on the container; and, of course, to carry the water and beverages. However, the skin may be relatively thin and the basic liner serves to protect the bait fish. The liners are disposable because after extended use, they become clogged or mutilated and do not perform their function of permitting the breathing action up to par. Also, the liners, usually of styrofoam, are fragile and readily break up if abused.

An interesting facet of the invention resides in the openings through the housing to establish air communication with the interior of the lining, because these openings may be configured into advertising messages or personal initials or the like and thus provide a dual function.

Further, a clip is provided to receive a conventional flashlight for directing its light down into the drawer to enable the fisherman to select tackle after dark.

Thus, it may be appropriate that the subject combination bait and tackle container is oriented completely toward the taking of the particular predetermined type fish upon which the fisherman decided.

Also, the liners may be made small enough so that two or three may be used in the housing rather than a single compartmented liner, thereby adding versitility.

A further feature of the invention includes a scale printed on the exterior of the housing to reveal the volume of fluid contained at any time within the compartments, thereby enabling the fisherman to gauge the number of bait fish which the compartments will safely handle.

With the foregoing in mind, the invention will be better understood from a reading of the following detailed description thereof when taken in light of the accompanying drawings wherein.

Figure 1:
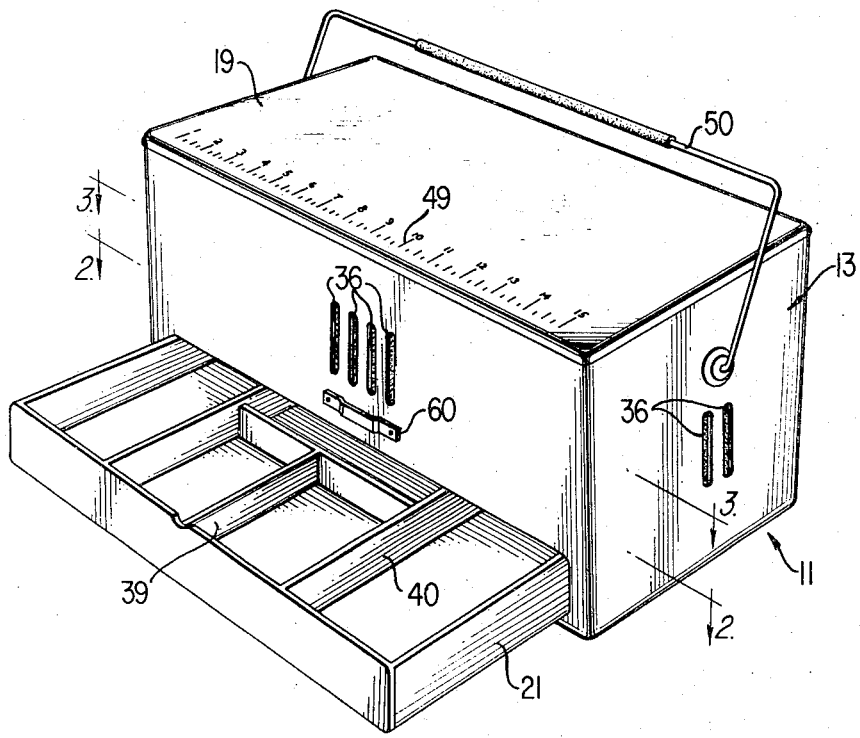
FIG. 1 is a view in perspective of the combination bait and tackle container.
Figure 2:
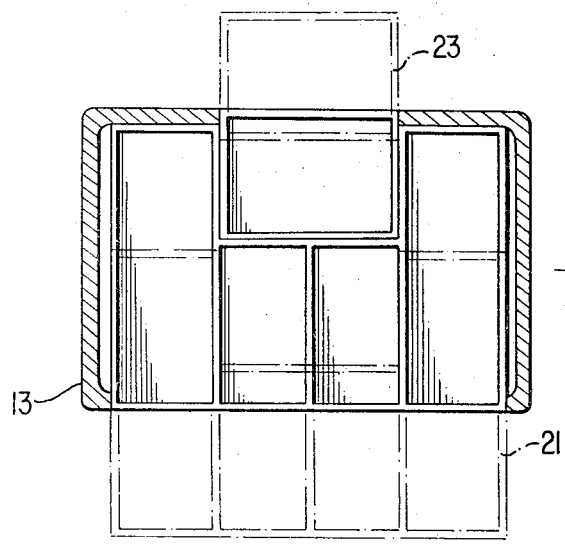
FIG. 2 is a view taken along the plane 2—2 of FIG. 1 showing the drawers extended in phantom outline.
Figure 3:
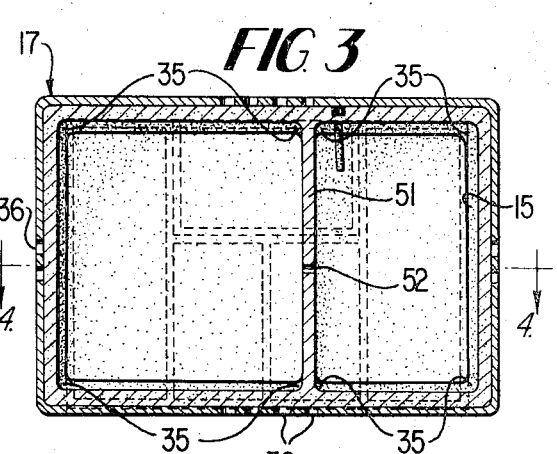
FIG. 3 is a view looking down into the interior of the container of FIG. 1 as taken along the plane 3—3.
Figure 4:
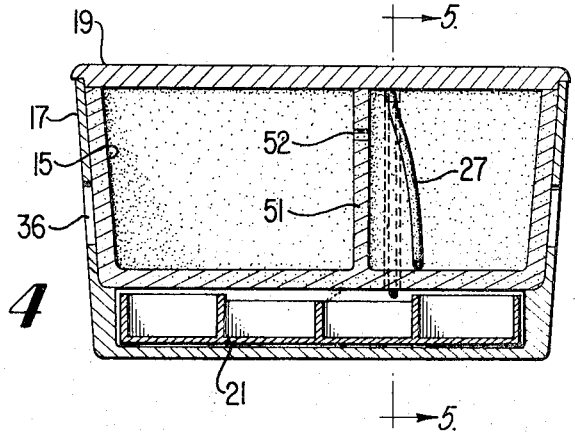
FIG. 4 is a vertical sectional view of the structure of FIG. 1, but taken on the plane 4—4 of FIG. 3.
Figure 6:
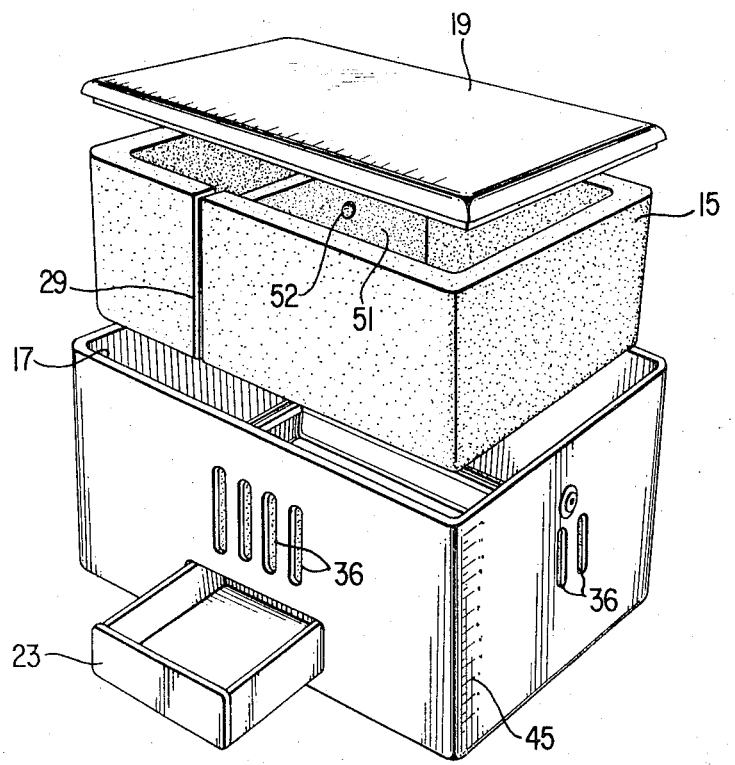
FIG. 6 is an exploded view of the entire bait container and tackle box.

Referring now to the drawings, the combination bait and tackle box is best seen in FIG. 1 at 11. It comprises the housing 13, which includes one or more foamed liners 15 (FIG. 6) contained within a relatively tight-fitting, hard plastic skin (FIGS. 3, 4 and 6).

The lid or cover 19 is preferably formed of the tough plastic skin and may include styrofoam core (not shown) or simply entrapped air to form improved insulative qualities. Alternatively, as illustrated, it is preferably made of the durable or tough skin completely, in order that the combination bait and tackle box 11 may serve as a seat, when desirable.

Figure 5:
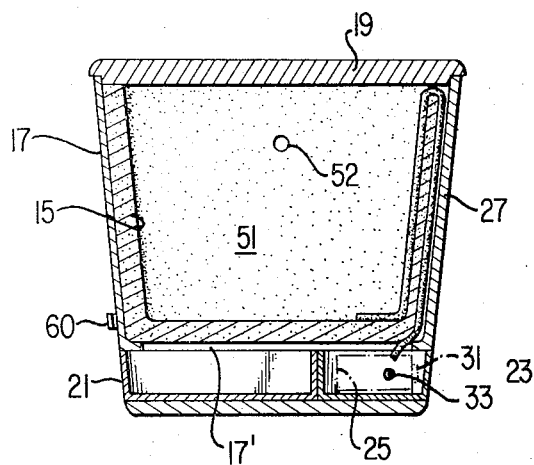
FIG. 5 shows a further vertical sectional view of the structure of FIG. 1 as taken along the plane 5—5 of FIG. 4.

The housing 11 includes a front drawer 21 which occupies a space below the liner 15 but within the skin 17. From FIG. 5 it may be seen that the skin 17 includes a false bottom or intermediate layer portion 17' provided to support the liner 15 and carry the bulk of the weight, usually water, ice or beverages.

A further drawer 23 (best seen in FIG. 6) is provided in the reverse side of housing 11 and is especially adapted to contain air pump 25 (FIG. 5), which pumps air over tube 27 carried in groove 29 of liner 15 so that the tube 27 may extend over the upper edge of the liner and terminate near the bottom of the liner interior to provide maximum use of the air pumped to the bait fish. Pump 25 includes a battery compartment 31 for miniature batteries and on/off switch 33.

A very important feature of the invention resides in the curved vertical corners — all designated by the numeral 35 in FIG. 3, because it is these corners into which the bait fish crowd and suffocate. Also, another important feature of the invention resides in the openings through the plastic skin of housing 11 because these openings communicate between the environment and the styrofoam liner 15, the latter being sufficiently porous to allow the bait fish to draw air therethrough.

The arrangement of drawers is also a feature of the invention because the large tackle drawer 21 includes a recess in its rearward portion to receive the small pump drawer 23. It is the large tackle drawer 21 which is interchangeable with additional drawers to permit the fisherman to select the drawer in accordance with the type species he is going to pursue. The interfitting feature further enables the pump battery to be replaced without interferring with the tackle drawer but while maximizing use of the volume of the combination bait and tackle container. The compartments of drawer 21 formed by dividers such as 39 and 40 permit the isolation of tools and tackle of various types; and these compartments may be modified as to size and arrangement in accordance with the weight of the tackle being used for the respective species.

While not illustrated, the air slots 36 may be in the form of advertising, as by a particular bait shop or a beverage sponsor or others interested in reaching the large fisherman market.

Another important feature of the invention resides in the scale 45 (FIG. 6) because this is a volumetric scale related to the size of either one or both interior compartments which may be used for the bait fish. It enables the selection of the least volume of water for a given number of bait fish to keep them alive for a specified time. For example, assume that the scale is for a four-hour period and that one gallon of water will support one-half dozen bait fish. All other calculations may be made proportionately and the fisherman is then not required to carry the additional weight of unnecessary bait fish water.

The container carries the usual scale 49 for measuring caught fish and handle 50 of conventional design.

It should be appreciated that the bait fish compartments may be isolated, as for use with different bait fish, or maybe unitary. For this reason, a partition 51 is illustrated with an opening 52 therethrough; and, of course, the partition may be made removeable, if desirable.

Bracket 60, connected to box 11 above drawer 21, is provided for receiving the clip of a flashlight (not shown) to facilitate night fishing.

What is claimed is:

1. A renewable bait and tackle container comprising in combination a rigid housing having a hollow interior and spaced-apart openings therethrough;
   a porous liner configured to fit snugly within the housing and of material capable of passing air but substantially containing water;
   a lid adapted to fit the liner and close the housing;
   said liner characterized by an absence of square corners joining the walls thereof;
   a volumetric scale related to the volume of the porous liner to indicate the level of water relative to the number of bait fish for survival for a given period of time;
   drawer means; and
   said housing defining an open space between the bottom thereof and said liner to accommodate said drawer means.

2. The container of claim 1 further comprising aerating means disposed in said space and connected to dispense air into the interior of the liner.

3. The container of claim 2 further comprising compartment means within the liner to divide the liner into at least two compartments; and said compartment means including at least one orifice for establishing fluid communication therethrough.

4. The container of claim 3 further comprising means for generating light; said means carried by the housing and disposed above the drawer means.

5. The container of claim 1 further comprising advertising indicia in the form of openings through the rigit housing.

6. The container of claim 1 wherein said drawer means comprises at least two drawers configured to complementarily fit each other so as to maximize the total drawer space.

7. A renewable bait and tackle container comprising in combination a generally rectangular rigid housing having a hollow interior and spaced-apart openings therethrough;
   a porous liner configured to fit within the housing and of material capable of passing air but substantially containing water;
   a lid adapted to fit the liner and close the housing;
   said liner characterized by an absence of square corners joining the walls thereof;
   a plurality of interchangeable drawer means for accommodating different types of predetermined tackle; and
   said housing defining an open space between the bottom thereof and said liner to accommodate a selected drawer means.

* * * * *